R. T. CRANE.
Improvement in Machines for Tapping Gas-Fittings.
No. 133,016. Patented Nov. 12, 1872.
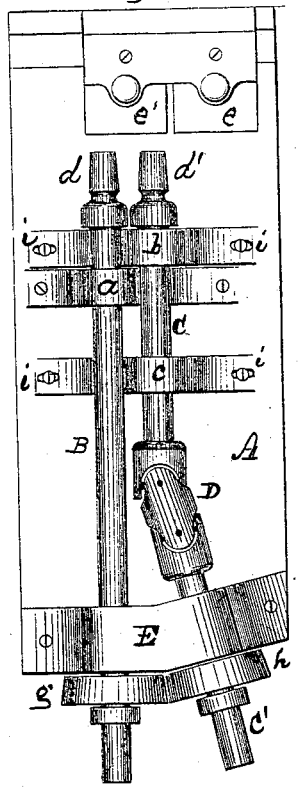
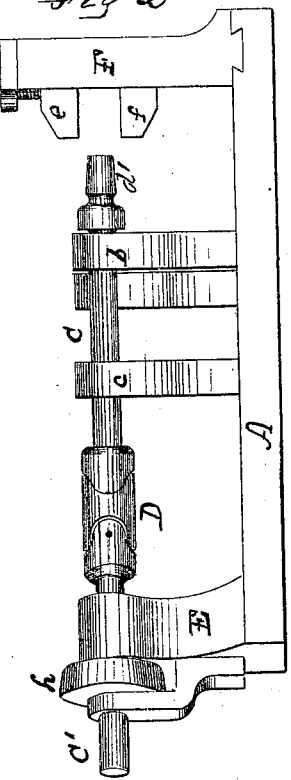
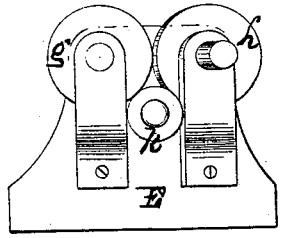

UNITED STATES PATENT OFFICE.

RICHARD T. CRANE, OF CHICAGO, ILLINOIS.

IMPROVEMENT IN MACHINES FOR TAPPING GAS-FITTINGS.

Specification forming part of Letters Patent No. 133,016, dated November 12, 1872.

*To all whom it may concern:*

Be it known that I, RICHARD T. CRANE, of the city of Chicago, in the county of Cook and State of Illinois, have invented certain new and useful Improvements in Machines for Tapping Pipe-Fittings, of which the following is a full description, reference being had to the accompanying drawing making a part of this specification, in which—

Figure 1 is a plan view; Fig. 2, a side elevation; and Fig. 3, an end view.

The object of my invention is to so construct a machine for tapping return pipe-fittings that both openings in a fitting can be tapped at the same time, and also so that the two taps may be placed at an angle with each other, if desired; and this I accomplish by making the shaft which carries one of the taps in two pieces, connected together by a double universal joint, and making the bearings for one end of the shaft movable.

In the drawing, A represents the bed; B, a shaft, upon which is a tap, d. This shaft is supported in bearings E a, which may be fixed. C C' is another shaft, which carries the tap d'. This shaft is made in two parts, which are connected together by the double universal joint D. The part C of this shaft is supported in bearings b c, which may be movable by means of the screw and slots i. The other part C' is supported in the bearing E. g h are gear-wheels secured one upon each shaft. K is a small gear-wheel engaging with g h, and driven in any suitable manner. The wheels g h will both revolve in the same direction, and do not engage with each other. F is a sliding head, which may be moved from one side to the other of the bed A. To this head are secured two vises for holding the fittings, e f representing one and e' representing the upper part of the other; j, screws to hold the fittings in place between the jaws of the vises.

With this machine I bring the two shafts which carry the taps very near to each other, and am able to arrange the driving-wheels conveniently, so that both openings of a small fitting can be tapped at the same time, and the shaft C C' can, if desired, be placed at an angle with B instead of parallel thereto, as shown. While one fitting is being tapped another can be placed in the vacant vise ready to be tapped. The shafts B C C' are made to advance and recede by any suitable device.

What I claim as new is as follows:

The combination of the shaft C C', made in two parts, and connected by a universal joint with the gear-wheels g h k and the clamps, substantially as set forth.

RICHARD T. CRANE.

Witnesses:
  E. A. WEST,
  O. W. BOND.